(12) United States Patent
Grant et al.

(10) Patent No.: US 6,308,889 B1
(45) Date of Patent: *Oct. 30, 2001

(54) SMART CARD READER WITH ELECTROSTATIC DISCHARGE PROTECTION

(75) Inventors: John Lincoln Grant, Sherborn, MA (US); Michael Patrick Cuff; Claude Grant Folta, both of Georgetown, TX (US)

(73) Assignee: Airborn, Inc., Georgetown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/223,064

(22) Filed: Dec. 30, 1998

Related U.S. Application Data

(62) Division of application No. 08/843,735, filed on Apr. 21, 1997, now Pat. No. 5,892,216.

(51) Int. Cl.[7] ....................................................... G06K 7/06
(52) U.S. Cl. .......................... 235/441; 235/492; 439/630
(58) Field of Search ................................... 235/441, 439, 235/442, 451, 485, 486, 492, 630, 489; 361/737; 439/630, 489

(56) References Cited

U.S. PATENT DOCUMENTS 3,778,753 * 12/1973 Occhhipinti et al. ................ 339/156
4,269,467 * 5/1981 Hughes ................................ 339/126
4,501,465 * 2/1985 Hoshino et al. .................... 339/176
4,747,790 * 5/1988 Masuda et al. ..................... 439/631
4,900,272 * 2/1990 Lange et al. ....................... 439/630
4,900,273 * 2/1990 Pernet ................................. 439/630
4,969,842 * 11/1990 Davis ................................... 439/629
5,005,106 * 4/1991 Kiku .................................... 361/424
5,043,562 * 8/1991 Hautvast et al. .................... 235/440
5,157,244 * 10/1992 Mroczkowski et al. ............. 235/441
5,161,992 * 11/1992 Birch ................................... 439/260
5,231,274 * 7/1993 Reynier et al. ..................... 235/441
5,380,997 * 1/1995 Hania et al. ........................ 235/485
5,451,165 * 9/1995 Cearley-Cabbiness et al. ...... 439/71
5,691,525 * 11/1997 Aoki et al. .......................... 235/379
5,892,216 * 4/1999 Grant et al. ........................ 235/492

FOREIGN PATENT DOCUMENTS

468828 * 1/1992 (EP) .
91/04547 * 4/1991 (WO) .

* cited by examiner

Primary Examiner—Karl D. Frech
Assistant Examiner—Diane I. Lee
(74) Attorney, Agent, or Firm—Jenkens & Gilchrist, A Professional Corporation

(57) ABSTRACT

A smart card reader having several advantageous grounding techniques and several techniques to insure proper electrical isolation of the electrical components of the card reader. The smart card reader has a base and a cover. In certain techniques, a non-conductive base is grounded to a conductive, grounded cover. In another technique, a grounded base formed of a statically dissipative composite material is utilized.

11 Claims, 3 Drawing Sheets

SMART CARD READER WITH ELECTROSTATIC DISCHARGE PROTECTION

This application is a Divisional of prior application Ser. No. 08/843,735 filed on Apr. 21, 1997, now U.S. Pat. No. 5,392,216.

FIELD OF THE INVENTION

The present invention pertains to smart card readers, and more particularly, but not by way of limitation, to a card reader for eliminating problems with electrostatic discharge that often occurs when a smart card is inserted into a card reader.

HISTORY OF THE PRIOR ART

Credit cards have long been an accepted part of life around the world. Early credit cards had identifying information raised from the remainder of the card, and the identifying information was transferred from the card by the use of pressure and carbon paper. More modern credit and debit cards have their identifying information as fixed electronic data, such as a scanable magnetic strip embedded on the surface of a card. Such identifying information exists within the card in a read-only format. Smart cards, the most recent advancement in the card art, utilize an active integrated circuit embedded within the card to store identifying information. Unlike prior art cards, smart cards have the additional capability of altering the identifying information stored in their integrated circuits. Smart cards may be utilized for any function of a prior art credit or debit card and have also proven useful in a wide variety of other functions, including paying bills; paying for mass transit; performing health care benefit transactions; and in using pay telephones, automated teller machines, in-home digital satellite systems, "set top" boxes used with cable television, or other similar equipment.

The integrated circuit in a smart card is typically a memory chip or a microprocessor chip. To provide access to the information stored in the integrated circuit of the card, operative regions such as contact pads are provided on the surface of the card, and the integrated circuit is electrically connected to these operative regions.

A smart card reader typically has a housing having a slot through which the card is inserted and removed. After insertion, the smart card is manipulated into a reading position, in which the operative regions of the card are in contact with certain terminals in the card reader. The terminals of the card reader are typically electrically connected to a printed circuit board containing the additional circuity necessary for a given transaction. After a transaction is complete, the card is returned to the user.

Electrostatic discharge (ESD) frequently creates problems for smart card users. Smart cards are typically made of a nonconductive material, such as plastic. Normal handling of a card, such as removal and insertion of a card from a user's wallet or billfold, may cause electrostatic charge to build up in the card. When a user inserts a card into a smart card reader, and when the card comes into contact with the conductive terminals of the card reader, electric shock may occur. This electric shock is similar to the shock that occurs when one walks across a carpeted floor and then touches a metal object such as a lamp. Such shock may damage or cause malfunction of the integrated circuit within the smart card, and it may also damage or cause malfunction of the circuitry on the printed circuit board to which the card reader is electrically connected.

In addition, after a period of use, body oils or other partially conductive material may collect on the surface of a smart card. Such conductive material may be sufficient to transfer electrostatic charge built up on the user of a card to the card itself. Such additional electrostatic charge exacerbates the ESD problems experienced by smart cards.

Several prior art techniques have been formulated to address the ESD problem of smart cards. For example, it is known to provide a smart card reader with a cover or top portion made of a conductive material and to connect the cover to ground. During insertion, a smart card contacts the cover before it contacts the conductive terminals connected to the base or bottom portion of the smart card reader. In this way, electrostatic charge may be discharged through the cover to ground, and a damaging electric shock is avoided. U.S. Pat. No. 5,380,997 assigned to Alcatel Radiotelephone discloses such a technique.

In addition, it is known to form a card reader cover from a highly resistive, yet conductive material and to ground the cover to a chassis. Alternatively, it is also known to paint or coat the cover of a card reader with a highly resistive, yet conductive material and to ground the painted cover to a chassis. Such materials provide a relatively slow discharge rate for the electrostatic charge, in contrast to the relatively fast discharge rate of a damaging electric shock. Furthermore, a variety of conventional conductive plastics providing ESD protection and electromagnetic interference shielding are sold by the Bekaert Corporation of Marietta, Ga. under the BEKI-SHIELD trademark.

With the availability of such conventional techniques to address the ESD problems of a smart card reader, it would be advantageous to provide a simple, low cost technique of grounding a conductive card reader cover. The smart card reader of the present invention provides several advantageous grounding techniques and several techniques to insure proper electrical isolation of the electrical components of the card reader without a substantial increase in complexity or cost as compared to conventional card readers.

SUMMARY OF THE INVENTION

The present invention pertains to grounding techniques for a smart card reader and techniques to insure proper electrical isolation of the electrical components of the smart card reader. More particularly, one aspect of the invention includes an improved smart card reader of the type having a non-conductive base and a conductive, grounded cover mated with the base to form a slot for insertion of a smart card. The base has a least one terminal for contacting an operative region of the smart card and a switch electrically connected to a base ground pin. The base ground pin is for electrically connecting to a ground of a printed circuit board. The improvement of the present invention comprises a cover ground pin electrically connected to the base ground pin and upwardly depending from the base. An aperture is provided in the cover that receives at least a portion of the cover ground pin and makes electrical connection therewith.

In another aspect, the present invention includes a smart card reader of the type having a non-conductive base and a conductive, grounded cover mated with the base to form a slot for insertion of a smart card. The base has a plurality of terminals for contacting an operative region of the smart card. The improvement comprises a plurality of slots formed in the cover, in which each of the plurality of slots is disposed directly above one of the plurality of terminals. Such a cover insures proper electrical isolation of the terminals of the smart card reader.

In a further aspect, the invention includes an improved smart card reader of the type having a non-conductive base and a conductive, grounded cover mated with the base to form a slot for insertion of a smart card. The base has a least one terminal having a first end for electrically connecting to a printed circuit board and a second end for contacting an operative region of smart card. The improvement comprises a conductive post downwardly depending from the cover and through a grounded hole in the printed circuit board. The post makes electrical connection with the grounded hole.

In a further aspect, the invention includes an improved method for grounding a conductive cover of a smart card reader. The card reader has a non-conductive base mated with the cover, and the base has a switch electrically connected to a base ground pin. The base ground pin is for electrically connecting to a ground of a printed circuit board. The improvement comprises electrically connecting a cover ground pin to said base ground pin, and positioning the cover ground pin in the base so that the cover ground pin is in physical and electrical contact with the cover.

In a further aspect, the invention includes an improved method for grounding a conductive cover of a smart card reader. The card reader has a non-conductive base mated with the cover, and the card reader is electrically connected to a printed circuit board. The improvement comprises forming a conductive post downward from the cover and through a grounded hole in the printed circuit board. The post is in physical contact with, and is electrically connected with, the grounded hole.

In a further aspect, a smart card reader comprises a cover and a base mated with the cover to form a slot for receiving a smart card. The base is formed of a statically dissipative composite material having a surface resistivity in the range from about $1 \times 10^6$ up to about $1 \times 10^{10}$ ohms/sq (ohms/square). The base is electrically connected to a ground.

Yet another aspect of the invention is a method of dissipating electrostatic charge from a smart card being inserted into a card reader, in which the card reader has a base with at least one terminal, and the terminal has a first end electrically connected to a printed circuit board and a second end for contacting an operative region of the smart cart. The base is formed from a statically dissipative composite material having a surface resistivity in the range from about $1 \times 10^6$ up to about $1 \times 10^{10}$ ohms/sq. The base is grounded to a ground of the printed circuit board. Upon insertion of the smart card into the reader, the card contacts the base before the card contacts the terminal.

BRIEF DESCRIPTION OF THE DRAWINGS

For a more complete understanding of the present invention, and for further objects and advantages thereof, reference is made to the following description taken in conjunction with the accompanying drawings, in which.

DETAILED DESCRIPTION OF THE PREFERRED EMBODIMENTS

The preferred embodiments of the present invention and their advantages are best understood by referring to FIGS. 1–7 of the drawings, like numerals being used for like and corresponding parts of the various drawings.

Figure 2:
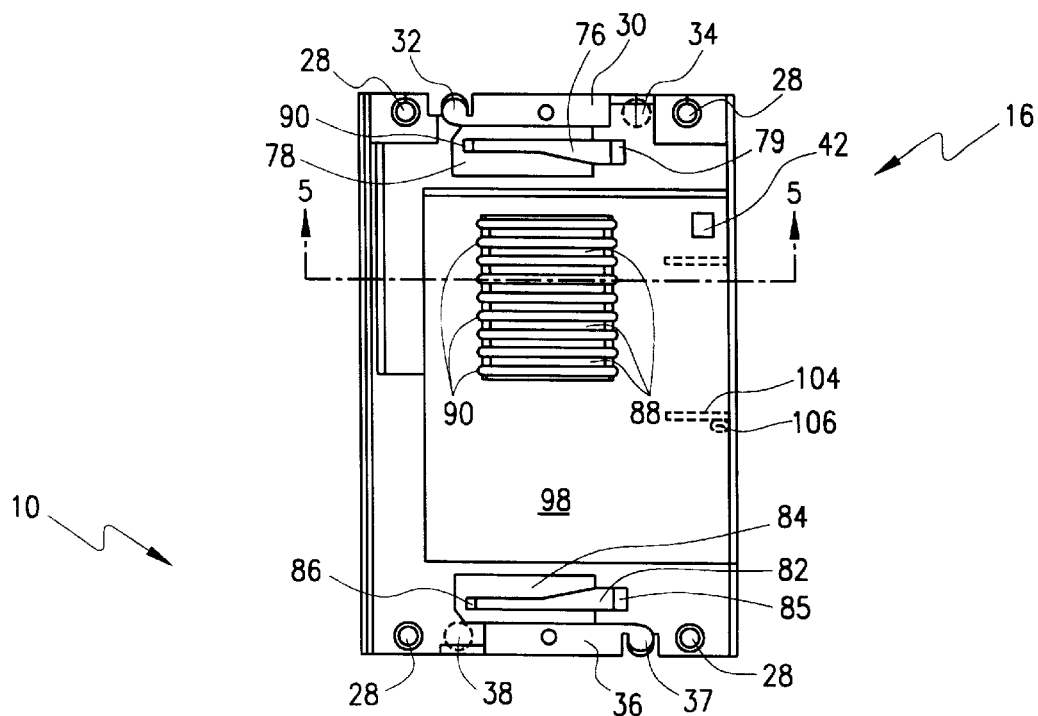
FIG. 2 is a top view of the card reader cover according to a preferred embodiment of the present invention shown separated from the base of FIG. 1 for clarity.
Figure 1:
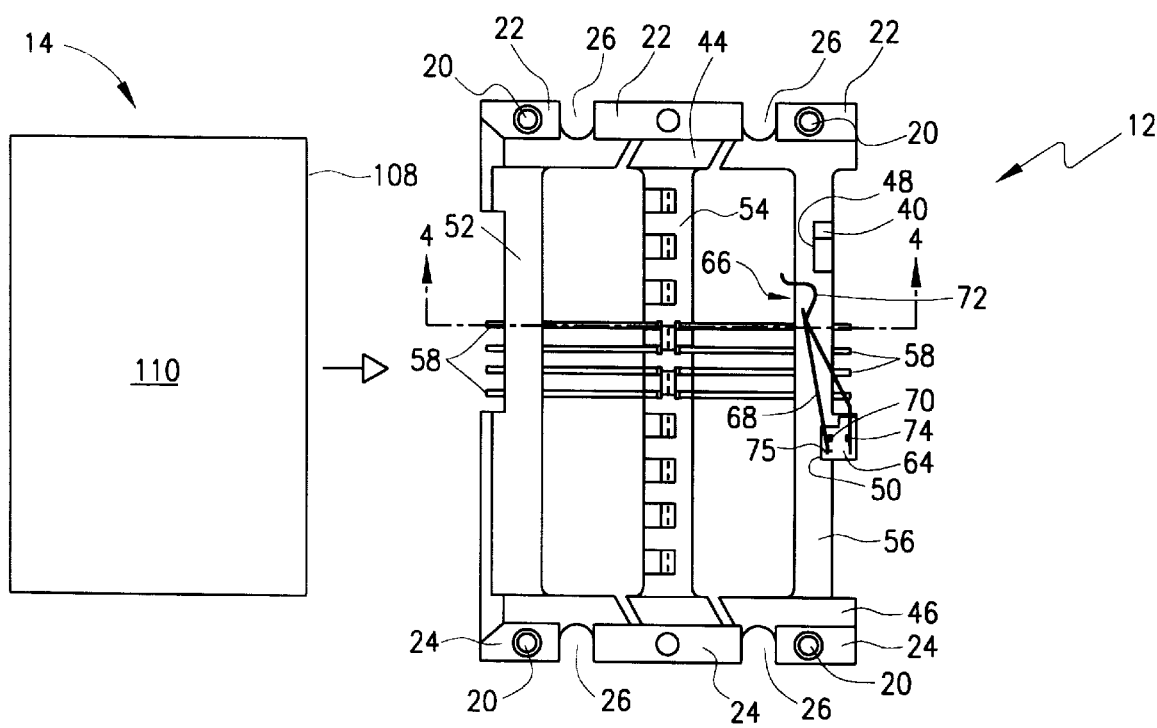
FIG. 1 is a top view of the card reader base according to a preferred embodiment of the present invention illustrating the insertion of a smart card therein.
Figure 3:
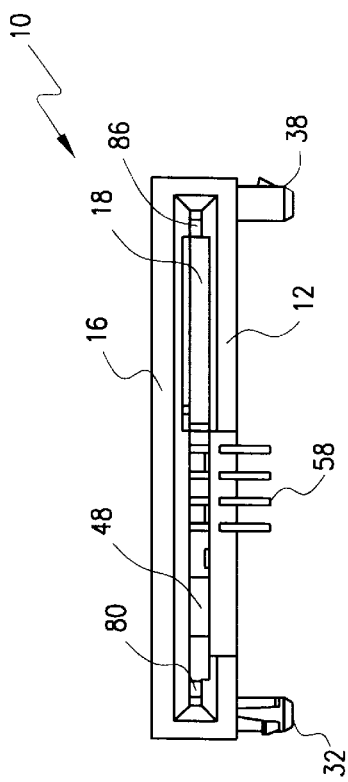
FIG. 3 is a front view of the card reader according to a preferred embodiment of the present invention showing the slot into which a smart card is inserted.

Referring first to FIG. 1, a top view of a base 12 of a card reader 10 and a smart card 14 for insertion into card reader 10 are shown. FIG. 2 shows a top view of a cover 16 of card reader 10, with cover 16 separated from base 12 for clarity of illustration. FIG. 3 shows a front view of card reader 10 with base 12 and cover 16 mated together to form a slot 18. Card 14 is inserted into slot 18 during operation of card reader 10.

Referring again to FIGS. 1 and 2, the structure for mating base 12 to cover 16 will now be described. As shown in FIG. 1, base 12 has four base jigs 20 located on its four corners. Although four base jigs are shown in FIG. 1, this number is merely preferred and fewer or more base jigs may be utilized for specific applications of card reader 10. Raised surfaces 22 and 24 are located on each side of base 12, and two apertures 26 are located in each of surfaces 22 and 24, respectively. As shown in FIG. 2, cover 16 has four holes 28 located on its four corners for mating with base jigs 20. Cover 16 also has a raised surface 30 on one end. Posts 32 and 34, located proximate raised surface 30, downwardly depend from cover 16. A raised surface 36 is located on the end of cover 16 opposite raised surface 30. Posts 37 and 38, located proximate raised surface 36, downwardly depend from cover 16. Posts 32, 34, 37, and 38 extend through apertures 26 of base 12 when base 12 and cover 16 are mated. Base 12 also contains a base jig 40 proximate its rear end. Base jig 40 mates with a hole 42 in cover 16. The above-described structure insures proper alignment and mating of base 12 and cover 16. Of course, modified alignment structures could be utilized by one skilled in the card reader art.

Figure 4:
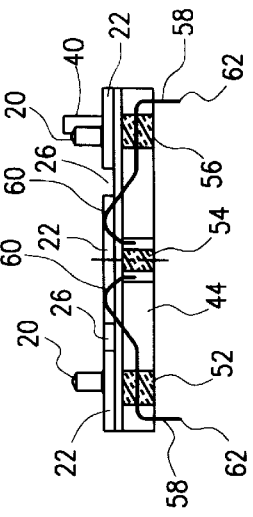
FIG. 4 is a cross-sectional view of the base of FIG. 1 along line 4—4.

Referring to FIGS. 1 and 4, the structure of base 12 will now be described in more detail. As shown in FIG. 1, card support surfaces 44 and 46 are located on opposite ends of base 12. Member 52, comb 54, and member 56 are transverse to card support surfaces 44 and 46. Conductive terminals 58 are supported by member 52 and member 56. Comb 54 insures that each terminal 58 is electrically isolated from the adjacent terminals. Although only four pairs of terminals 58 are shown in FIG. 1, fewer or more terminals could be utilized, depending on the specific application of card reader 10. FIG. 4 provides a more detailed view of terminals 58 supported within base 12. In particular, each terminal 58 has a card contacting region 60 proximate comb 54 and a printed circuit board connector 62 on its end opposite card contacting region 60.

Referring again to FIG. 1, a switch base 64 is located on member 56. The front surfaces of base jig 40 and switch base 64 form card stops 48 and 50, respectively. A switch 66 is mechanically and electrically connected to switch base 64. More specifically, a ground arm 68 of switch 66 is coupled to a base ground pin 70 located in switch base 64. A power arm 72 of switch 66 is coupled to a base power pin 74 of switch base 64. Although not shown in FIG. 1, base ground pin 70 and base power pin 74 extend downwardly from the bottom surface of base 12 for connection with the ground and power lines of a printed circuit board (not shown), respectively. A cover ground pin 75 preferably extends upwardly from the top surface of switch base 64. Cover ground pin 75 is electrically connected to base ground pin 70 and ground arm 68.

Figure 5:
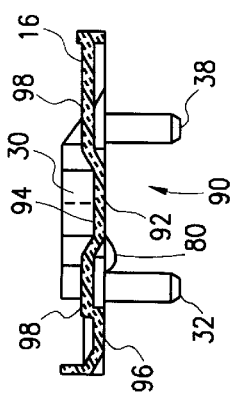
FIG. 5 is a cross-sectional view of the cover of FIG. 2 along line 5—5.

Referring to FIGS. 2 and 5, the structure of cover 16 will now be described in more detail. As shown in FIG. 2, an integral spring member 76 is formed in cover 16 proximate raised surface 30. An aperture 78 generally surrounds all but an end 79 of spring member 76. Spring member 76 has contacting end 80 biased against upward movement for frictionally engaging card 14 when it is inserted into card reader 10. A second integral spring member 82 is formed in cover 16 proximate raised surface 36 and opposite spring member 76. An aperture 84 generally surrounds all but an end 85 of spring member 82. Spring member 82 has a contacting end 86 biased against upward movement for frictionally engaging card 14 when it is inserted into card reader 10. Of course, spring members 76 and 82 may be coupled to, instead of integrally formed with, cover 16. Various geometries can be used for spring members 76 and 82 as long as the spring members have contacting ends for engaging card 14. In addition, although two spring members are shown in FIG. 2, only one spring member or more than two spring members may be utilized for specific applications of card reader 10. Furthermore, although not shown in FIG. 2, it may be advantageous to connect contacting ends 80 and 86 with a contacting bar for frictionally engaging card 14 across a large portion of its width.

A plurality of cover slots 88, each slot 88 being formed by a pair of adjacent walls 90, are formed in cover 16 generally above terminals 58 of base 12. As is shown best in FIG. 5, walls 90 have a bottom surface 92 and a top surface 94. Bottom surface 92 is preferably generally planar with surface 96 of cover 16, located proximate slot 18. Top surface 94 is preferably lower than the surrounding surface 98 of cover 16. When base 12 and cover 16 are mated together, a respective one of cover slots 88 is directly over a corresponding terminal 58.

Cover slots 88 maintain proper electrical isolation of terminals 58 when cover 16 is formed of a conductive material. More specifically, if a terminal 58 is moved upward toward cover 16, the terminal 58 moves into its respective cover slot 88, without contacting cover 16. Cover slots 88 thus significantly reduce the likelihood of a short circuit, and a corresponding malfunction of card reader 10, that may otherwise occur if one of terminals 58 contacts cover 16. Such short circuits would frequently occur because each contacting region 60 of each terminal 58 is preferably positioned within its respective cover slot 88 in a free, unbiased state. Such a design insures an adequate amount of deflection of terminals 58 during contact with card 14 so that a consistent and reliable electrical connection between the operative regions of card 14 and terminals 58 is formed.

Cover 16 has an aperture 106 on its bottom surface proximate its rear end. Aperture 106 is preferably located on a raised surface 104, and aperture 106 receives cover ground pin 75 when base 12 and cover 16 are mated. Raised surface 104, cover ground pin 75, and aperture 106 are preferably sized so as to provide consistent, frictional contact between at least a portion of cover ground pin 75 and aperture 106 when base 12 and cover 16 are mated.

Figure 6:
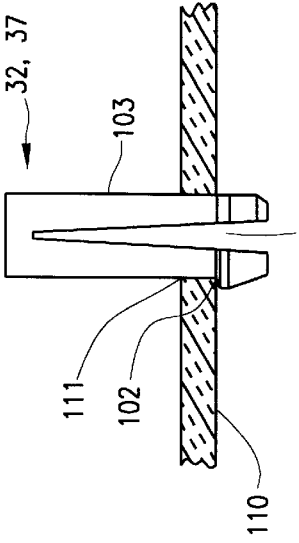
FIG. 6 is a detailed view of a cover post according to a preferred embodiment of the present invention.

As mentioned previously, cover 16 preferably has four posts 32, 34, 37, and 38. These posts are used to secure card reader 10 to a printed circuit board (not shown). More specifically, each of the posts is received in a corresponding hole in the printed circuit board. Posts 32 and 37 are preferably formed as shown in FIG. 6. Each of posts 32 and 37 has a longitudinal split 100 and a lip 102 on its lower end. Posts 32 and 37 are sized so that upon insertion into the corresponding holes in a printed circuit board, split 100 temporarily compresses and then expands, securing lip 102 on the bottom surface of the printed circuit board. In this manner, a secure mating of card reader 10 to the printed circuit board is achieved.

Referring again to FIGS. 1 and 2, card 14 is typically made from a non-conductive plastic. Base 12 is preferably made from a non-conductive plastic, although any conventional non-conductive electronics housing material could also be utilized for base 12. Terminals 58, ground arm 68, base ground pin 70, power arm 72, base power pin 74, and cover ground pin 75 are preferably made from a conventional conductive metal, such as a copper alloy, a beryllium-copper alloy, a phosphor-bronze alloy, or brass.

In contrast, cover 16 is preferably made from a conventional statically dissipative composite material. As used in the present invention, a "statically dissipative composite material" is a generally insulating material containing conductive additives resulting in a surface resistivity in the range from about $1 \times 10^6$ up to about $1 \times 10^{10}$ ohms/sq (ohms/square). Such materials are highly resistive and only slightly conductive, and such materials minimize electrical "leakage" to nearby electronic components and help to insure that all components are properly electrically isolated. A preferred class of statically dissipative composite materials are thermoplastics containing conductive additives such as carbon fiber or carbon powder. A specific example of such a preferred statically dissipative thermoplastic composite is the STAT-KON Dissipative Composites, which are commercially available from LNP Engineering Plastics, Inc. of Exton, Pa.

In addition, cover 16 may also be made from a conventional conductive composite material. As used in the present invention, a "conductive composite material" is a generally insulating material containing conductive additives resulting in a surface resistivity in the range from about $1 \times 10^2$ up to about $1 \times 10^6$ ohms/sq. Such materials are also highly resistive and only slightly conductive, but such materials are less resistive, and more conductive, than statically dissipative composite materials. A preferred class of conductive composite materials are thermoplastics containing conductive additives such as carbon fiber, carbon powder, stainless steel, or nickel coated carbon reinforcements. A specific example of such a preferred conductive thermoplastic composite is the STAT-KON Conductive Composites, which are commercially available from LNP Engineering Plastics, Inc. of Exton, Pa.

The insertion of card 14 into card reader 10, and the preferred technique of preventing a damaging electrical shock due to such insertion, will now be described. As shown best in FIGS. 1 and 3, a leading edge 108 of card 14 is inserted into slot 18. Card 14 slides across support surfaces 44 and 46 of base 12 (FIG. 1). When leading edge 108 reaches a point indicated by line $t_1$—$t_1$ in FIG. 7, contact ends 80 and 86 of integral spring members 76 and 82, respectively, contact upper surface 110 of card 14. At this time, any electrostatic charge affecting card 14 is transferred from card 14, to integral spring members 76 and 82, to the body of cover 16, to downwardly depending surface 104 and aperture 106 of cover 16, to cover ground pin 75, to base ground pin 70, and finally to the printed circuit board ground connected to base ground pin 70. of course, electrostatic charge is also dissipated by card 14 contacting cover 16 before contacting contact ends 80 and 86. All, or substantially all of this electrostatic charge is dissipated to the printed circuit board ground via the above-described path before leading edge 108 of card 14 reaches contacting region 60 (FIG. 4) of terminals 58, indicated by line $t_2$—$t_2$ in FIG. 7. In this manner, a damaging electrical shock is prevented when leading edge 108 touches contacting region 60 of terminals 58. Significantly, downwardly depending surface 104, aperture 106, and cover ground pin 75 may easily be added to most conventional card readers with minimal additional cost to or redesign of the card reader.

Electrostatic charge affecting card 14 may be dissipated without a damaging electrical shock, and cover 16 may be grounded using an additional, or alternative, grounding path. More specifically, at least one of posts 32 and 37 of cover 16 may be inserted into grounded holes within the printed circuit board (not shown) to which card reader 10 is connected. Efficient grounding is insured by split 100 and lip 102 of posts 32 and 37 (FIG. 6). When posts 32 and 37 are inserted into a grounded hole, split 100 expands to insure a consistent, frictional contact between an outer surface 103 of the posts and the grounded holes. As one skilled the card reader art may appreciate, grounding via this technique may be accomplished at any mating point on cover 16 and its corresponding printed circuit board at which both a post and a grounded hole can be formed.

Figure 7:
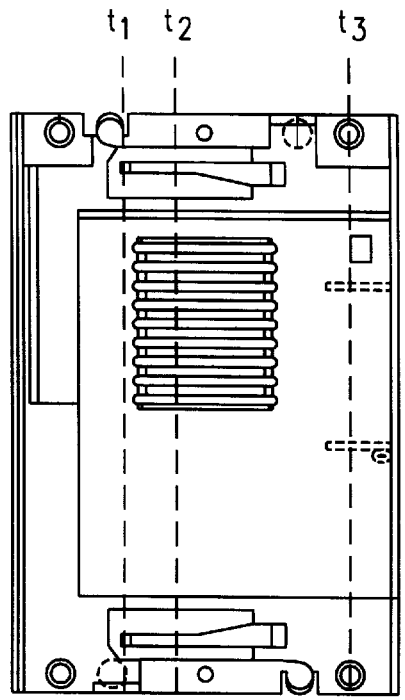
FIG. 7 is a top view of the base of FIG. 1 and the cover of FIG. 2 illustrating the operation of the card reader according to a preferred embodiment of the present invention.
Figure 7:
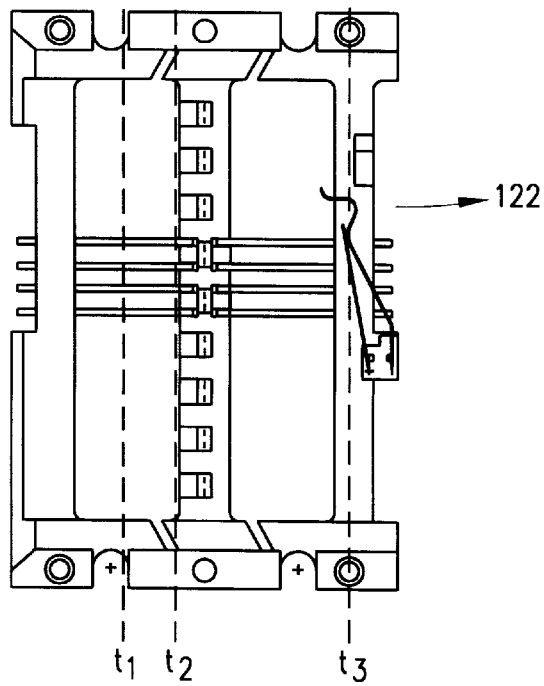

As mentioned above, all or substantially all of the electrostatic charge affecting card 14 must be dissipated in the time leading edge 108 of card 14 travels between points indicated by lines $t_1$—$t_1$ and $t_2$—$t_2$ in FIG. 7. It is believed that various factors influence this rate of dissipation, including the rate at which card 14 is inserted into card reader 10, the amount of electrostatic charge affecting card 14, the physical spacing between lines $t_1$—$t_1$ and $t_2$—$t_2$ as shown in FIG. 7, the conductivity of cover 16, and the conductivity of card 14 itself. However, it is also believed that the surface area of contact ends 80 and 86, and the proximity of contact ends 80 and 86 to the integrated circuit or the operative regions of card 14, do not significantly influence this rate of dissipation for most applications of card reader 10. At a typical insertion rate for card 14 (approximately 0.5 to 2.0 feet/sec), and with card 14 carrying a typical amount of electrostatic charge (approximately 10,000 to 15,000 V), forming cover 16 with STAT-KON Dissipative Composites and a spacing of at least 0.050 inches between lines $t_1$—$t_1$ and $t_2$—$t_2$ is believed to be particularly advantageous in preventing damaging electric shock.

As is also explained above, electrostatic charge on card 14 typically originates from two sources. First, card 14 may build up its own charge due to normal handling, such as removal and insertion of card 14 from a user's wallet or billfold. Second, after body oils or other partially conductive material collects on the surface of card 14, electrostatic charge built up on the user of card 14 may be transferred to card 14 itself. In many applications of card reader 10, it is believed that dissipating only the charge from card 14 will be sufficient to avoid damaging electrical shock. For such applications, forming cover 16 from a statically dissipative composite material is preferred. However, in applications in which it also proves necessary to dissipate both the charge from card 14 itself and the charge carried by the user of card 14, a conductive composite material, which is more conductive than statically dissipative composite materials, may be preferred.

At a point indicated by line $t_3$—$t_3$ in FIG. 7, leading edge 108 of card 14 begins moving switch 66 (FIG. 1) in the direction of arrow 122. Just before leading edge 108 abuts card stops 48 and 50, ground arm 68 and power arm 72 of switch 66 separate, signaling the printed circuit board circuitry (not shown) to read the integrated circuit of card 14. At this point, the operative regions of card 14 (not shown) are electrically connected to contacting regions 60 of terminals 58.

According to a second preferred embodiment of the present invention, cover 16 is preferably made from a non-conductive plastic, and base 12 is preferably made from a conventional statically dissipative composite material. The statically dissipative composite material selected must be conductive enough to dissipate electrostatic charge from card 14 to base 12, to base ground pin 70, and to the ground of the printed circuit board (not shown) connected to card reader 10. The statically dissipative composite material selected must also provide adequate electrical isolation between operative regions of base 12, such as each terminal 58, base ground pin 70, and base power pin 74. Therefore, it is believed that statically dissipative composite materials having a surface resistivity in the range from about $1 \times 10^8$ up to about $1 \times 10^{10}$ ohms/sq are most preferred with this second embodiment. A preferred class of statically dissipative composite materials that are believed to be advantageous with this second preferred embodiment are thermoplastics containing conductive additives such as carbon fiber or carbon powder. A specific example of such a preferred statically dissipative thermoplastic composite is the STAT-KON Dissipative Composites.

Of course, in this second preferred embodiment, cover grounding pin 75, cover slots 88, walls 90, downwardly depending surface 104, and aperture 106 may be eliminated, if desired. In addition, in this second preferred embodiment, integral spring members 76 and 82 insure adequate contact between the bottom surface of card 14 and base 12, including support surfaces 44 and 46 upon which card 14 slides into card reader 10. Furthermore, in this second preferred embodiment, base 12 may be electrically connected to any suitable ground other than a ground of the printed circuit board to which card reader 10 is connected.

From the above, it may be appreciated that the smart card reader of the present invention provides improved techniques of grounding a card reader in order to eliminate damaging electrical shock due to electrostatic charge building up on the smart card. The smart card reader of the present invention also provides advantageous techniques to insure proper electrical isolation of the electrical components of the card reader. These advantages are provided without a substantial increase in complexity or cost as compared to conventional card readers.

The present invention is illustrated herein by example, and various modifications may be made by a person of ordinary skill in the art. For example, numerous geometries and/or relative dimensions could be altered to accommodate a given application of the smart card reader.

It is thus believed that the operation and construction of the present invention will be apparent from the foregoing description. While the method and apparatus shown or described have been characterized as being preferred it will be obvious that various changes and modifications may be made therein without departing from the spirit and scope of the invention as defined in the following claims.

What is claimed is:

1. An improved smart card reader having a non-conductive base and a conductive, grounded cover mated with said base to form a card slot for insertion of a smart card, and in which said base has a plurality of terminals for contacting an operative region of said smart card, wherein the improvement comprises:

a plurality of terminal-isolating slots formed in said cover, each of said plurality of terminal-isolating slots being disposed directly above one of said plurality of terminals for isolating said terminals and said cover from one another, each of said plurality of terminal-isolating slots being sized to admit a terminal thereinto upon flexure of said terminal.

2. The improved card reader of claim 1 wherein said cover is formed from a statically dissipative composite material having a surface resistivity in the range from about $1 \times 10^6$ ohms/sq. up to about $1 \times 10^{10}$ ohms/sq.

3. The improved card reader of claim 1 wherein said cover is formed from a conductive composite material having a surface resistivity in the range from about $1 \times 10^2$ ohms/sq. up to about $1 \times 10^6$ ohms/sq.

4. An improved smart card reader having a non-conductive base and a conductive, grounded cover mated with said base to form a slot for insertion of a smart card, and in which said base has at least one terminal having a first end for electrically connecting to a printed circuit board and a second end for contacting an operative region of smart card, wherein the improvement comprises:

a conductive post downwardly depending from said cover and through a grounded hole in said printed circuit board;

said post making electrical connection with said grounded hole.

5. The improved card reader of claim 4 wherein said cover and said post are formed from a statically dissipative composite material having a surface resistivity in the range from about $1 \times 10^6$ ohms/sq. up to about $1 \times 10^{10}$ ohms/sq.

6. The improved card reader of claim 5 wherein said cover comprises a spring member for contacting said smart card before said smart card contacts said terminal; and wherein said statically dissipative composite material is a thermoplastic containing conductive additives.

7. The improved card reader of claim 4 wherein said cover and said post are formed from a conductive composite material having a surface resistivity in the range from about $1 \times 10^2$ ohms/sq. up to about $1 \times 10^6$ ohms/sq.

8. The improved card reader of claim 4 wherein said post comprises a longitudinal split and a lip on a lower end, and wherein upon insertion of said post into said grounded hole, said lip secures against a bottom surface of said printed circuit board, and said split expands to insure consistent contact between said post and said grounded hole.

9. In a method for grounding a conductive cover of a smart card reader, wherein said card reader has a non-conductive base mated with said cover, and wherein said card reader is electrically connected to a printed circuit board, the improvement comprising:

forming a conductive post downward from said cover and through a grounded hole in said post is in physical contact with, and is electrically connected with, said grounded hole.

10. The method of claim 9, further comprising the step of forming said cover and said post from a statically dissipative composite material having a surface resistivity in the range from about $1 \times 10^6$ ohms/sq. up to about $1 \times 10^{10}$ ohms/sq.

11. The method of claim 9, further comprising the step of forming said cover and said post from a statically dissipative composite material having a surface resistivity in the range from about $1 \times 10^2$ ohms/sq. up to about $1 \times 10^6$ ohms/sq.

* * * * *

UNITED STATES PATENT AND TRADEMARK OFFICE
CERTIFICATE OF CORRECTION

PATENT NO. : 6,308,889 B1
DATED : October 30, 2001
INVENTOR(S) : John L. Grant et al.

It is certified that error appears in the above-identified patent and that said Letters Patent is hereby corrected as shown below:

<u>Column 6,</u>
Line 1, delete "not shown" and replace with -- 110 --
Line 3, after "hole" insert -- 111 --; and after "board" insert -- 110 --
Line 7, after "holes" insert -- 111 --; and delete "a" after the word -- in --
Lines 7, 9 and 11, after "board" insert -- 110 --

Signed and Sealed this

Twenty-second Day of April, 2003

JAMES E. ROGAN
*Director of the United States Patent and Trademark Office*